Oct. 24, 1944.     R. C. MORRIS ET AL     2,360,862
SOLVENT EXTRACTION PROCESS
Filed Nov. 19, 1943
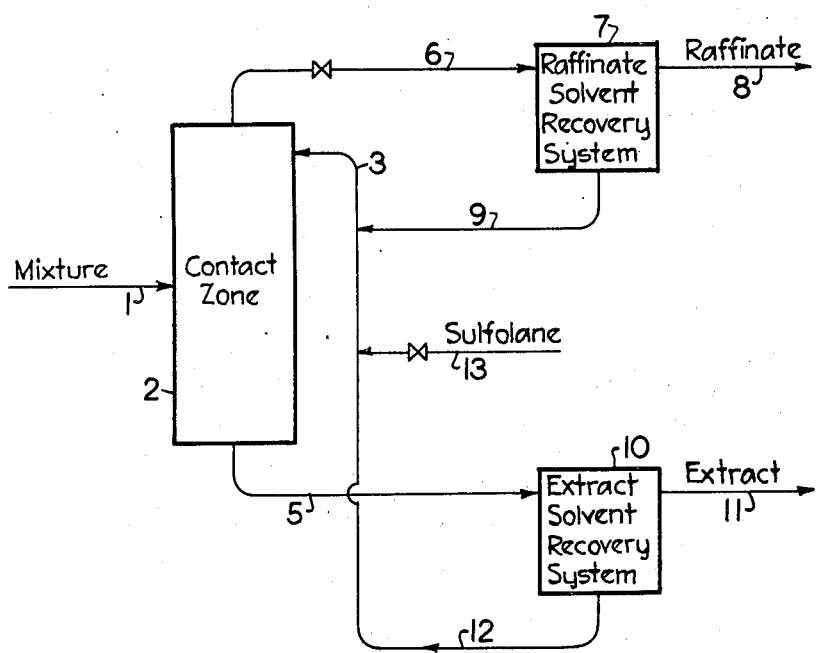
Inventors: Rupert C. Morris
           Edward C. Shokal
By their Attorney:

Patented Oct. 24, 1944

2,360,862

UNITED STATES PATENT OFFICE 2,360,862

SOLVENT EXTRACTION PROCESS

Rupert C. Morris, Berkeley, and Edward C. Shokal, Oakland, Calif., assignors to Shell Development Company, San Francisco, Calif., a corporation of Delaware Application November 19, 1943, Serial No. 510,980

12 Claims. (Cl. 260—97.5)

This invention relates to a process for purifying and separating non-cellulosic wood products by extraction with selective solvents comprising a sulfolane. This is a continuation-in-part of our copending application Serial No. 475,210 filed February 8, 1943.

The compound sulfolane has the formula

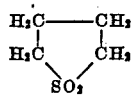

Its derivatives are compounds wherein one or more of the hydrogen atoms is replaced by an organic radical which may contain a polar grouping and more specifically may contain oxygen, nitrogen, sulfur and/or halide atoms. In hydrocarbon-substituted sulfolanes the hydrocarbon radicals are preferably alkyl radicals. Sulfolane derivatives containing oxygen include hydroxy sulfolanes, sulfolanyl ethers, and esters; sulfolane derivatives containing nitrogen include sulfolanyl amines, nitriles and nitro sulfolanes; sulfolane derivatives containing sulfur include sulfolanyl sulfides, sulfoxides and sulfones. Other sulfolane derivatives may contain halide radicals, inorganic ester or mixed radicals of those above mentioned, such as acid amides, halohydrins, sulfonamides, etc. Derivatives may be made by condensing a conjugated diolefin with sulfur dioxide, and then subjecting the resultant product to hydrogenation, alkylation, hydration, amination, chlorination, nitration and/or other substitution or addition reactions.

It is a purpose of this invention to separate and purify the non-cellulosic products from wood into various fractions economically, efficiently and effectively by solvent extraction. Some specific purposes, among others, are to produce various fractions, particularly suitable for use in paints, synthetic resins, food products, plastics, soaps, emulsifiers, etc.; to produce pure compounds to separate mixtures of different degrees or types of unsaturation into fractions containing a higher ratio of the more unsaturated or more actively unsaturated components than the original mixture; to decolorize and/or stabilize such non-cellulosic wood products, etc.

Generally, the process of this invention comprises the steps of (a) contacting the mixture to be separated in the liquid state with a liquid selective solvent to produce a raffinate phase and an extract phase, (b) separating the two phases from each other, and (c) removing the solvent from at least one of said phases to produce a raffinate and/or an extract and, usually, also recovering the solvent removed for further contact with more of said mixture. These steps, common to all solvent extraction processes, may be carried out in any suitable manner known to those skilled in the art.

The accompanying drawing is a general flow diagram of a solvent extraction process.

A mixture to be separated is introduced in the liquid state through feed line 1 into contact zone 2 and admixed with a suitable sulfolane introduced into the same zone through a separate line 3. This is the first step (a) in all solvent extraction processes. Suitable equipment for carrying it out may comprise either an impinging jet mixer, an agitation vessel, a baffle plate column, or a packed tower.

In the contacting zone the mixture and sulfolane are caused to produce a raffinate phase and an extract phase which are separately withdrawn respectively through lines 6 and 5. If separation of phases has not occurred under the conditions employed, cooling or injection of a demixing agent, etc., may have to be employed. This is the second step (b) of all solvent extraction processes, namely, the separation of two phases produced in the contacting zone, and may be effected by settling, decantation, or centrifuging.

The third step (c) common to all solvent extraction processes comprises the recovery of sulfolane from one or both phases. The raffinate phase is passed through line 6 into the raffinate solvent recovery system 7 to produce a solvent-free raffinate, which is withdrawn through line 8, and recovered sulfolane which is withdrawn through line 9 and is preferably returned through line 3 to contact zone 2. This recovery system may comprise a crystallization chamber, distillation column, or washing column. If the sulfolane is washed from the raffinate phase an additional step for its recovery is necessary, such as distillation, to separate the sulfolane from the wash solvent.

The extract phase is introduced into a solvent recovery system 10, which is similar to recovery system 7. From recovery system 10 a solvent-free extract is withdrawn through line 11 and the recovered sulfolane is withdrawn through line 12 and returned through line 3 to contact zone 2 for recontact with more of the mixture. Fresh sulfolane may be added to the system from time to time through line 13 as required.

The extraction temperature generally may range within wide limits, provided it is above the melting temperature of the solvent and below the boiling temperature of both the mixture and the solvent. The temperature for contacting the solvent mixture may be such that both the solvent and the mixture are completely miscible with each other and then the temperature may be lowered until phase separation takes place, or the contact may be entirely carried out below the temperature of complete miscibility of the sulfolane and the mixture. The extraction temperature may range between about −50° C. and about +300° C.

The ratio of solvent to the feed mixture must be such that two phases will form. If the ratio is too high, all of the mixture may dissolve in the solvent; if it is too low, the solvent may dissolve in the mixture. Useful solvent-to-feed ratios may range from about ½ to 20 by volume.

The non-cellulosic wood products which may be extracted, separated and/or purified may be obtained from wood by mechanical, thermal and/or chemical means such as by distillation, chemical reaction or solvent extraction, even including extraction with a solvent comprising a sulfolane as disclosed herein. The non-cellulosic wood products vary according to the method by which they are obtained. If the wood is distilled, for example, the products include generally charcoal, acetic acid, acetone, wood alcohol, methyl acetone and wood tar, as well as gases such as carbon dioxide, carbon monoxide, methane, hydrogen and some hydrocarbon vapors. More specifically liquid non-cellulosic products obtained from wood distillation may be divided into two main parts (1) pyroligneous acid and (2) tar.

Pyroligneous acid is a very complex mixture and contains from 80-90% water. The most important compounds in it are formic acid, acetic acid, methyl alcohol, allyl alcohol, acetone and methyl acetate. However, there are also present small amounts of soluble tar and of propionic acid, butyric acid, valeric acid, caproic acid, crotonic acid, angelic acid, methylamine, isoamyl alcohol, a-methyl p-keto-penta methylene, pyromucic acid, acetaldehyde, furfural, methylfurfural, pyroxanthen, methyl formate, methyl propyl ketone, pyridine, methyl ethyl ketone, ethyl propyl ketone, dimethyl acetal, methylal, valero lactone, pyrocatechin, ammonia, isobutyl alcohol, ketopentamethylene, methyl pyridine, formaldehyde.

The tar may be divided into three main portions: light oils, boiling below about 140° C.; heavy oils, which are heavier than water, most of them boiling above about 200° C.; and pitch, probably formed by polymerization of complex aldehydes and ketones and possibly hydrocarbons.

The light oils in the tar include: valeric aldehyde, acetone, methyl ethyl ketone, methyl propyl ketone, methyl butyl ketone, di-ethyl ketone, adipic ketone, nitriles, di-methyl furane, tri-methyl furane, unsaturated hydrocarbons, toluene, m-xylene, methyl acetate, methyl propionate, methyl n-butyrate, methyl n-valerate, esters of unsaturated acids, sylvane and hydrochloric acid addition products.

The heavy oils in the tar include: phenol, o-, m- and p-cresol, phlorol, 1-3 xylenol-5, 1-3 xylenol-4, pyrocatechin, guaiacol, di-methyl ether of homopyrocatechin, coerulignol, pyrogallol, pyrogallol di-methyl ether, methyl pyrogallol di-methyl ether, propyl pyrogallol di-methyl ether, creosol and ethyl guaiacol.

If the wood is a soft wood and the distillation is not severe mixtures such as turpentine, pine oil, tar oils and tar and pitch may be separated. If the wood treatment is by extraction with a solvent such as naphtha, benzol, gasoline, etc., rosin and other resins may be obtained. Resins may also be collected directly from the sap from trees.

The resins obtained from wood mainly comprise turpentine and rosin. The turpentine consists particularly entirely of alpha and beta pinenes. Rosin is chiefly abietic acid and a small portion of alkali insoluble resins. More specifically turpentine includes pine oil which contains alpha pinene, beta pinene, di-pinene, limonene, camphene, cineol, alpha terpineol, borneol, fenchyl alcohol, camphor and methyl chavicol.

The resins which may be obtained from wood include resin esters, resinolic acids, resin alcohols and resenes. Generally, these resins may be divided into three groups; namely resins, oleo resins or turpentines or balsams and gum resins.

Some resins are:
(1) Acaroid resins
    Amine
(2) Amber
    Coutchouc
(3) Colophony (common rosin)
    Abietic or sylvic acid
    Colophonates, resinates
    Resin spirit
    Rosin oil
(4) Copal
    Copal (kauri)
(5) Dammar resin
(6) Dragon's blood
    Elemi
(7) Guaiacum
    Jalap
    Jalapin
(8) Mastic
(9) Sandarac
(10) Shellac (from insect)

Some oleo resins, turpentines, balsams are:
(1) Common turpentine
    Chian
(2) Bordeaux or French turpentine
    Burgundy pitch
(3) Venice or larch turpentine
    Mecca balsam
(4) Canada balsam
    Gurjun balsam
(5) Balsam of copaiba, copaiva, capivi
    Oil of copaiba Some gum resins are:
(1) Ammoniacum
(2) Asafoetida
(3) Elemi
(4) Galbanum
(5) Myrrh and bdelliumn
    Euphorbium
    Galbanum
    Gamboge
    Olibanum If the wood is extracted by solvents such as dioxanes and alcohols in the absence of acids and bases native lignin may be obtained. Native lignin has four naphthol groups, four hydroxyl groups and one carbonyl group and a unit molecular weight of about 840.

If the wood is subjected to treatment according to the well-known sulfate process for obtaining pulp for paper making, the by-products are mainly turpentine and tall oil, as well as some pine oil, di-methyl sulfate, methyl mercaptan, methanol, acetone, etc., the black liquor obtained from the sulfate process contains over 50% lignin and the rest as soaps of lactic acid, acetic acid, formic acid and fatty and rosin acids.

By-products from the well-known soda process for obtaining wood pulp for paper making include methanol, acetone, butanone, higher ketones, light oil and heavy oils. The black liquor from this process contains salts of formic, acetic and oxalic acid.

Some by-products of non-cellulosic nature from the well-known sulfite process comprise an aqueous distillate containing methyl alcohol, acetone, aldehyde and traces of acetic and formic acid together with a brown oil which latter contains cymene.

From the above list of non-cellulosic by-products obtained from wood products it has been found that their separation, purification and decoloration is very advantageously carried out by extraction with a solvent comprising a sulfolane. This is particularly true in the treatment of mixtures such as the black liquors, brown oil, pyroligneous acids and resins mentioned above.

The sulfolanes of this invention may be employed as selective solvents by themselves singly or as mixtures of two or more, or as aqueous solutions, or together with auxiliary selective solvents or antisolvents, provided the additives to the sulfolane do not react with it and are stable under the temperature conditions of the process.

The sulfolane should not crystallize out of solution at the highest concentration which may occur at any point in the process and at a temperature above about 150° C. It is desirable that it melt at a temperature not greater than 150° C. and preferably below 100° C., and it is further desirable that it be not more than 50% soluble at room temperature in kerosene having a Watson characterization factor of at least 12 (see Industrial and Engineering Chemistry, volume 27, page 1460, December, 1935, "Characterizations of petroleum fractions," by K. M. Watson, E. F. Nelson, and George B. Murphy). Higher solubility in such a kerosene frequently is an indication of poor selectivity.

Some suitable specific sulfolanes are: sulfolane, hydrocarbon-substituted sulfolanes such as alkyl sulfolanes, preferably containing not more than about 14 carbon atoms; hydroxy sulfolanes such as 3-sulfolanol, 2-sulfolanol, 3-methyl-4-sulfolanol, 3,4-sulfolanediol, etc.; sulfolanyl ethers such as methyl-3-, propyl-3-, allyl-3-, butyl-3-, crotyl-3-, isobutyl-3-, etc.; methallyl-3-, methyl vinyl carbinyl-3-, amyl-3-, hexyl-3-, octyl-3-, nonyl-3-, glycerol alpha-gamma-diallyl-beta-3-, tetrahydrofurfuryl-3-, 3,3,5-trimethylcyclohexyl-3-, m-cresyl-3-sulfolanyl ethers, corresponding 2-sulfolanyl ethers; disulfolanyl ethers, etc.; sulfolanyl esters such as 3-sulfolanyl acetate, 3-sulfolanyl propionate, -butyrate, -caproate, etc.; N-sulfolanes such as 3-sulfolanylamine, N-methyl, N-ethyl, N-N-dimethyl, N-allyl, N-butyl, N-octyl-3-sulfolanylamines, etc.; sulfolanyl sulfides such as ethyl-3-, tertiary butyl-3-, isobutyl-3-, methallyl-3-sulfolanyl sulfides, di-3-sulfolanyl sulfide, etc.; sulfolanyl sulfones such as methyl-3-, ethyl-3-, propyl-3-, amyl-3-sulfolanyl sulfones; sulfolanyl halides such as 3-chloro-, 3,4-dichloro-, 3-chloro-4-methyl sulfolanes, etc.; and mixed sulfolanes such as 4-chloro-3-sulfolanol, 4-chloro-3-sulfolanol acetate, 3-sulfolanyl amine hydrochloride, N(3-sulfolanyl) acetamide, etc.

Of the sulfolanes useful in this invention, some are more heat-stable than others; thus, in particular, the halogen, amine, acid, some aldehyde, and some ester derivatives are relatively heat-unstable. Some may begin to decompose at temperatures as low as 150° C. Other sulfolanes, on the other hand, are extremely heat-stable even at temperatures as high as 300° C.

Some commonly known solvents, selective solvents, and/or modifying agents which may be employed in conjunction with the sulfolanes include water, various mono- and poly-hydric alcohols such as methanol, ethanol, propanol, furfuryl alcohol, benzyl alcohol, glycols, glycerols, etc.; various ketones such as acetone, methyl ethyl ketone, diethyl ketone, cyclopentanone, benzophenone, phenyl tolyl ketone, diphenylene ketone, etc.; various aldehydes such as crotonaldehyde, acrolein, furfural, etc.; ethers such as ethylene glycol and diethylene glycol mono-alkyl ethers, mono- and diglycerol ethers, glycerol diethers, chlorinated dialkyl ethers (e. g. beta-beta-dichlorethyl ether), dioxane, etc.; lower aliphatic acids such as formic, acetic, propionic acids, acetic anhydride, etc.; esters such as benzoic, phthalic acid esters, etc.; phenol, cresylic acids, alkyl phenol mixtures, naphthols, alkyl naphthols, etc.; liquid ammonia, various organic amines such as lower aliphatic primary amines having one to eight carbon atoms, aniline, alkyl anilines, morpholine, diphenyl amine, ditolylamine, etc.; various nitriles such as acetonitrile, propionitrile, lactonitrile, butyronitrile, benzonitrile, etc.; various nitro hydrocarbons such as nitromethane, nitroethane, nitrobenzene, nitrotoluene, nitroxylenes, etc.; various pyridines and quinolines; liquid sulfur dioxide; various modifying salts such as those disclosed in U. S. Patent 2,246,257 to Kohn; and the like.

The sulfolane or mixture of sulfolane with auxiliary solvent must be at least partially and not more than partially miscible with the feed mixture to be separated under the conditions of the process.

Furthermore, antisolvents may be employed together with the sulfolanes such as are employed in the DuoSol process for the countercurrent extraction of lubricating oils. Some such antisolvents include propane, butane, pentane, n-hexane, iso-octane, paraffinic gasoline, kerosene, gas oil, lubricating oil, various ethers, trichlorethylene, carbon tetrachloride, etc. Still further, compounds of two or more solvents together with one or more antisolvents may also be employed.

The amount of auxiliary or antisolvents which may be employed in conjunction with the sulfolanes to make up the solvent may range up to 90% by volume, preferably less than 50% by volume, of the solvent.

*Example*

A mixture of 20 cc. of tall oil, 20 cc. of "hot acid octanes" (produced by the "hot acid process" described in the article by McAllister on pages 139–142 of the "Oil and Gas Journal" for November 12, 1937) and 10 cc. of dimethylsulfolane were shaken together and then cooled to 0° C. until two separate liquor layers appeared, the lower containing the sulfolane and also substantially all of the dark coloring matter present in the original tall oil.

We claim as our invention:

1. In a solvent extraction process for the separation of a liquid mixture of non-cellulosic wood products, the steps comprising contacting said mixture with a sulfolane which is liquid and stable at the temperature of contacting under conditions to produce two separate phases, an extract phase and a raffinate phase, and separating said phases.

2. The process of claim 1 wherein the mixture is tall oil.

3. The process of claim 1 wherein the mixture is a pyroligneous acid.

4. The process of claim 1 wherein the mixture comprises compounds of different degrees of saturation.

5. The process of claim 1 wherein the mixture is a black liquor from sulfate process.

6. The process of claim 1 wherein the melting temperature of the sulfolane is below about 150° C.

7. The process of claim 1 wherein the sulfolane at room temperature is less than 50% by weight soluble in kerosene having a Watson characterization factor of at least 12.

8. In a solvent extraction process for separating a mixture of non-cellulosic wood products, the steps comprising contacting said mixture with a sulfolane which is liquid and stable at the temperature of contacting under conditions to produce two separate phases, an extract phase and a raffinate phase, separating said phases, recovering said sulfolane from said separated phases, and returning the recovered sulfolane for further contact with more of said mixture.

9. In a solvent extraction process for separating a mixture of non-cellulosic wood products, the steps comprising contacting said mixture with a liquid selective solvent to produce two phases, and separating said phases, said selective solvent comprising not less than 10% by volume of a sulfolane which is stable at the temperature of contacting.

10. The process of claim 9 wherein the solvent comprises more than 50% by volume of said sulfolane.

11. The process of claim 9 wherein the solvent-to-mixture ratio ranges between ½ and 20 by volume.

12. In a solvent extraction process for decolorizing a liquid non-cellulosic wood by-product containing color impurities naturally associated therewith, the steps comprising contacting said liquid with a selective solvent to produce two phases and separating said phases, said selective solvent comprising a sulfolane which is liquid and stable at the temperature of contacting.

RUPERT C. MORRIS
EDWARD C. SHOKAL.